United States Patent [19]
Qian

[11] Patent Number: 6,051,936
[45] Date of Patent: Apr. 18, 2000

[54] ELECTRONIC LAMP BALLAST WITH POWER FEEDBACK THROUGH LINE INDUCTOR

[75] Inventor: Jinrong Qian, Croton-on-Hudson, N.Y.

[73] Assignee: Philips Electronics North America Corporation, New York, N.Y.

[21] Appl. No.: 09/222,904

[22] Filed: Dec. 30, 1998

[51] Int. Cl.[7] .................................................. H05B 37/02
[52] U.S. Cl. ...................... 315/224; 315/291; 315/DIG. 5
[58] Field of Search ................................ 315/224, 209 R, 315/219, 291, DIG. 5, 307

[56] References Cited

U.S. PATENT DOCUMENTS 5,313,142  5/1994  Wong ........................................ 315/205
5,363,020  11/1994  Chen et al. .......................... 315/209 R

*Primary Examiner*—David H. Vu
*Attorney, Agent, or Firm*—Bernard Franzblau

[57] ABSTRACT

Circulating current through a resonant tank circuit and inverter switches is reduced by feeding high frequency current back through a line inductor. A resonant load circuit is connected between an inverter output node and one of the terminals of the input rectifier circuit. A high frequency capacitor has one terminal connected to an AC-side terminal of the input rectifier circuit. The line inductor and the high frequency capacitor have values selected such that instantaneous high frequency capacitor current flow into that AC-side terminal has a greater magnitude than and polarity opposite to current through the line inductor into that AC-side terminal during a portion of every cycle of the high frequency voltage.

20 Claims, 5 Drawing Sheets

ELECTRONIC LAMP BALLAST WITH POWER FEEDBACK THROUGH LINE INDUCTOR

CROSS-REFERENCE TO RELATED APPLICATIONS

SELF-OSCILLATING RESONANT CONVERTER WITH PASSIVE FILTER REGULATOR, Ser. No. 09/221,954, filed Dec. 28, 1998 by C. Chang and assigned to the assignee of the instant application.

STATEMENT REGARDING FEDERALLY SPONSORED RESEARCH OR DEVELOPMENT

Not Applicable

BACKGROUND OF THE INVENTION

This invention relates to electronic ballasts for operating discharge lamps such as fluorescent lamps, and in particular to such ballasts having a minimum number of active components.

Most magnetically coupled self-oscillating inverters are manufactured in large quantities for sale in a highly competitive market. Half-bridge inverters are widely used because they have a relatively low parts count. Such inverters may be classified into two groups: those using a current transformer having a saturable core, generally together with power BJT's (bipolar junction transistors); and those using a current transformer having a linear core, generally together with MOSFETs (metal oxide semiconductor field effect transistors). As those of ordinary skill will recognize, in this context a linear core is one in which operation is over a region having a curved B-H characteristic, rather than a sharp B-H characteristic; that is, at all times the flux level is such that a significant increase in magnetizing current will be accompanied by a significant increase in flux level.

U.S. Pat. No. 5,313,142 discloses such a ballast circuit having a saturable core inductor having secondary windings connected to the control electrodes of the switching transistors. This inductor is in a series connected load circuit which includes another inductor and a lamp, the lamp having series and parallel capacitors. Self oscillation occurs when current through the saturable core inductor rises to a level which saturates the core such that voltage in the secondary windings drops and the switching transistor, which was turned on, is turned off. This load circuit is connected between the output node of the inverter and a node between two feedback capacitors, one to the DC ground bus and one to the AC side of a rectifier circuit, which may be either a voltage doubler type or a full wave bridge. The other AC-side terminal is connected to a line inductor. High frequency power fed back through the feedback capacitor develops a high frequency voltage across the line inductor, thereby providing a high frequency boost to the input signals applied to the rectifier diodes.

The ballast disclosed in this patent operates a fluorescent lamp which requires significant warm-up time for filaments in the lamp. To prevent generating a damagingly high overvoltage on the DC bus, two zener diodes limit the feedback when the lamp is not lit. The load circuit, and a snubber capacitor in parallel with the load circuit, are connected between a half-bridge BJT inverter and a feedback node. High frequency current into that node is divided between a capacitor C4 to signal ground and the feedback capacitor C5. The values of capacitors C4 and C5 are chosen to cause the circuit to act like a high frequency boost converter, so as to improve the circuit power factor and reduce line harmonics. However, it is clear that the line current is still discontinuous.

BRIEF SUMMARY OF THE INVENTION

An object of the invention is to reduce the switching current in a power factor corrected high frequency converter for a non-linear load.

Another object of the invention is to reduce the switching current in a power factor corrected lamp ballast with AC-side power feedback.

According to the invention, a converter or power factor corrected ballast has a DC supply circuit having two AC-side and two DC-side terminals, supplied with low frequency power directly through a small input inductor connected between an AC-side terminal between two diodes and any capacitors connected across the low frequency power source. Thus, the low frequency power source has an inductive source impedance. A half-bridge inverter receiving DC power from the DC supply circuit has an output node between two switches. A load circuit, connected between the output node and one of the four terminals, includes a resonance inductor, at least one capacitor forming part of a resonant circuit with the resonance inductor, and two connection points for a non-linear load which is at least substantially resistive in an operating condition.

In a first preferred embodiment, the converter is a lamp ballast connected to provide current source feedback, the rectifier is a full wave bridge rectifier, and a high frequency capacitor is connected across one of the diodes between the AC-side bridge rectifier terminals. During part of the high frequency cycle, the high frequency current has an instantaneous value greater than the line input current, and the difference between these currents charges the high frequency capacitor. During the next part of the high frequency cycle the high frequency capacitor is discharged, and provides a direct energy flow from the line to the bulk storage capacitor across the inverter.

By comparison with previously known ballasts, this configuration greatly reduces the circulating high frequency current, thereby reducing the switching load of the transistors, and the size and power losses in the resonant inductor.

In a second preferred embodiment the ballast is connected to provide voltage source feedback, and a high frequency capacitor is connected between one of the AC-side bridge rectifier terminals and a source of high frequency voltage, such as a lamp terminal or the inverter output node.

DETAILED DESCRIPTION OF THE INVENTION

Figure 1:
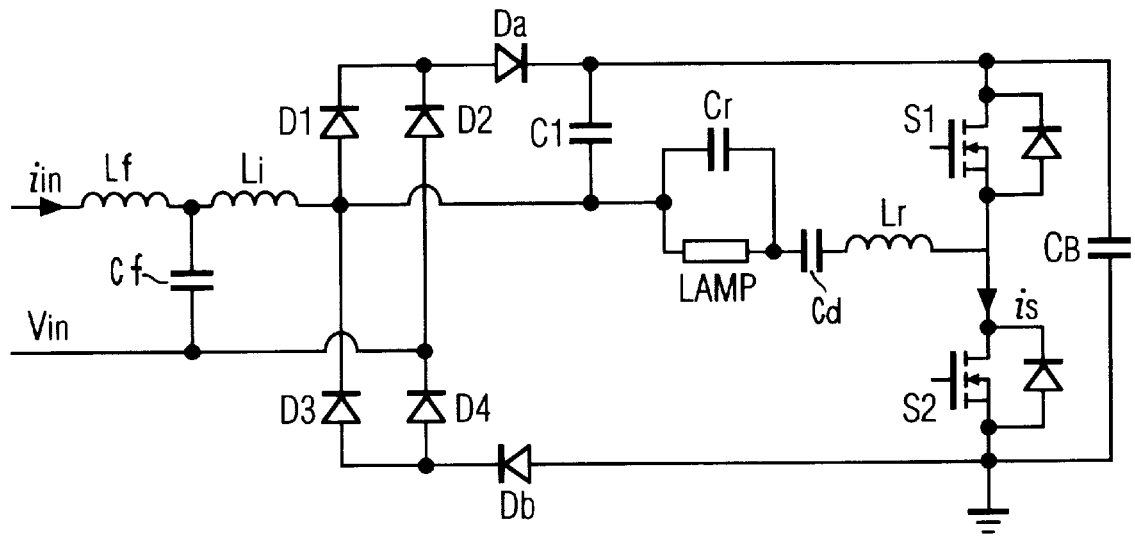
FIG. 1 is a simplified schematic diagram of a first embodiment of the invention with current feedback.

The converter of FIG. 1 includes an inverter formed by switching transistors S1, S2 connected in series across a DC bus having an electrolytic filter capacitor Cb. Power to the DC bus is supplied by a full wave bridge rectifier formed by slow diodes D1–D4, and two fast recovery diodes Da, Db. As will be discussed below, diodes Da, Db could be eliminated if all the bridge diodes are fast recovery types. Line power to the bridge rectifier is provided through an EMI filter formed by a series inductor Lf and shunt capacitor Cf, and a line inductor Li which is connected between the EMI filter and a first AC-side terminal of the bridge rectifier between diodes D1 and D3. The load circuit is connected between the first AC-side terminal and the inverter output node between the two switches. The load circuit includes a linear core resonance inductor Lr, a blocking capacitor Cd, and a resonance capacitor Cr, with a fluorescent lamp FL1 connected in parallel with the resonance capacitor. A feedback capacitor C1 is connected between the first AC-side terminal and the cathode of fast diode Da, which is the positive DC bus.

A circuit according to FIG. 1 has a line inductor Li=750 $\mu$H, a resonance inductor Lr=820 $\mu$H, and Cr=11 nF for line voltage of 220 V and an 85 watt lamp. By comparison, if there is no input inductor, the resonance circuit values would be Lr=680 $\mu$H, and Cr=19.6 nF. Because the unloaded tank impedance may be defined as $Z_o$ equal to the square root of Lr/Cr, this results in approximately a 50% increase in the unloaded tank impedance over a circuit without the line inductor. As a result, the current through the switches S1, S2 is reduced, and the ballast efficiency is improved.

Figure 2:
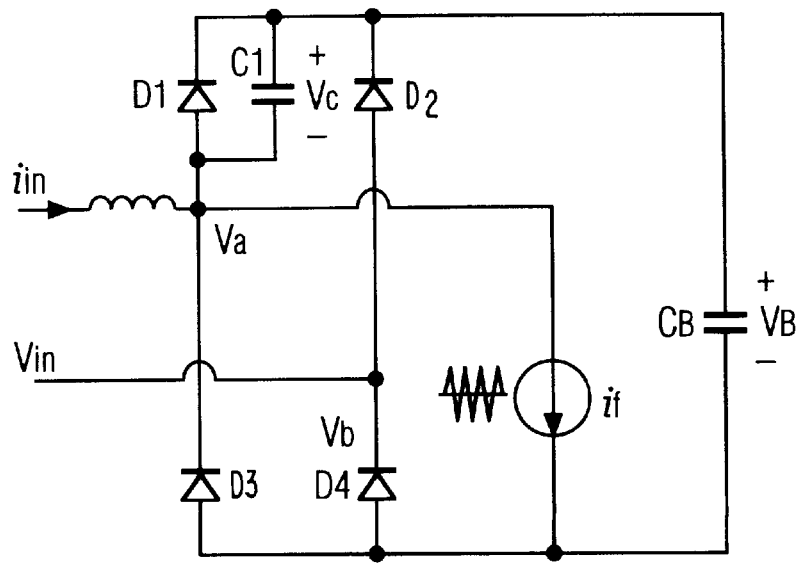
FIG. 2 is a conceptual circuit based on the embodiment of FIG. 1 showing current feedback to the AC-side.
Figure 3A:
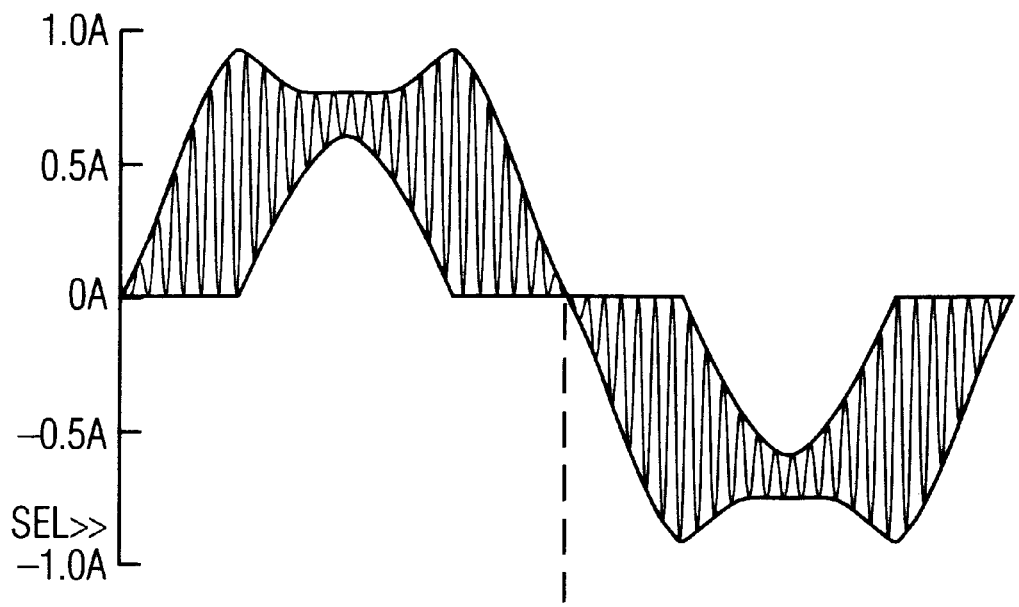
FIGS. 3A–3B are simulations of line inductor and line currents for the circuit of FIG. 2.
Figure 3B:
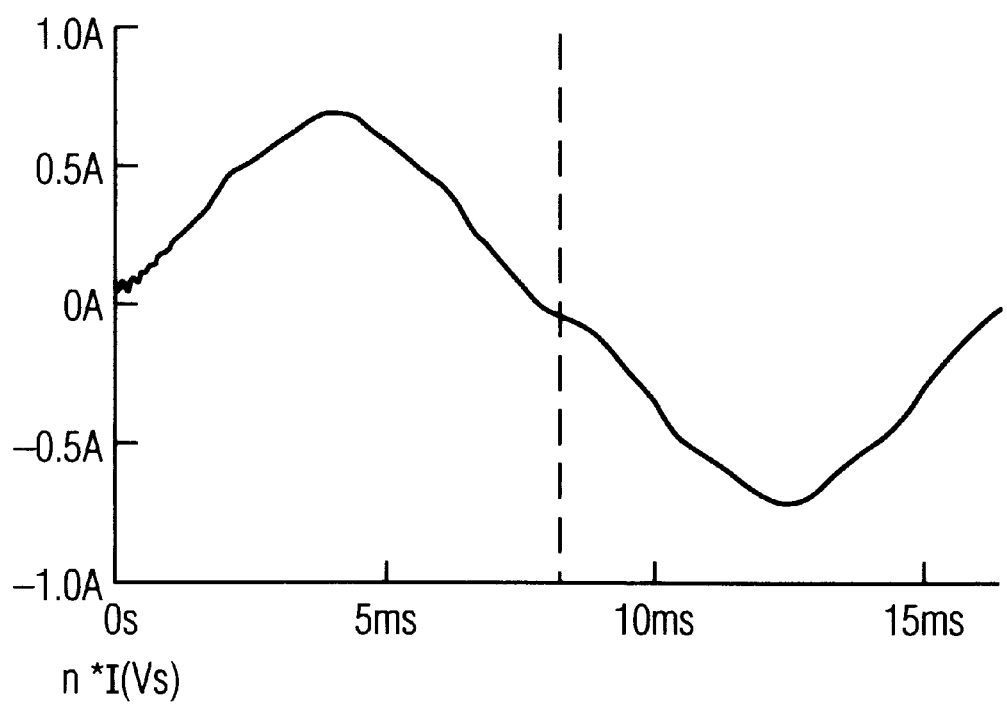

Conceptually, the circuit of FIG. 1 may be considered as having a current generator $i_f$ in place of the inverter and load circuit, as shown in FIG. 2. When this circuit was simulated, the current through the line inductor Li had the shape shown by the curve of FIG. 3A, which shows a substantial high frequency current superimposed on a low frequency current. The simulated line current, after filtering by the EMI filter, is shown in the curve of FIG. 3B.

During each switching cycle, there is a period of time when the feedback current $i_f$ has a greater instantaneous value than the line current $i_{in}$. During that period the capacitor C1 is charged by this current difference, and both the electrolytic (bulk) capacitor Cb and the line are providing energy to the current source, which may include the load.

During the balance of the cycle of high frequency current, the line current $i_{in}$ is greater than the instantaneous value of high frequency current $i_f$. At first C1 is discharged, and thereafter diodes D1 and D4, which for the purpose of simulation are fast recovery diodes, conduct the current difference between $i_f$ and $i_{in}$. The line input provides the energy to the current source which may include the load, while the extra energy charges the bulk capacitor Cb. As a result there is a direct power transfer, from the line input to the bulk capacitor, which does not have to be processed by the current source $i_f$. This is in contrast with a power factor correction circuit without inductor Li, where there is no direct power transfer from the line input to the bulk capacitor, and input power has to be processed by the resonant tank. As a result, the circuit of FIG. 2 can have a lower value of $i_f$ than would be the case of a pure current source PFC circuit without the line inductor.

The discussion above makes it clear that, during part of the high frequency cycle, high frequency current is flowing through both Lr and Li. Thus the circuit can be considered as having two resonant frequencies, even though each effective circuit connection is effective for less than a full high frequency cycle. For proper ballast operation, the switching frequency should be higher than either of the two resonant frequencies.

Figure 4:
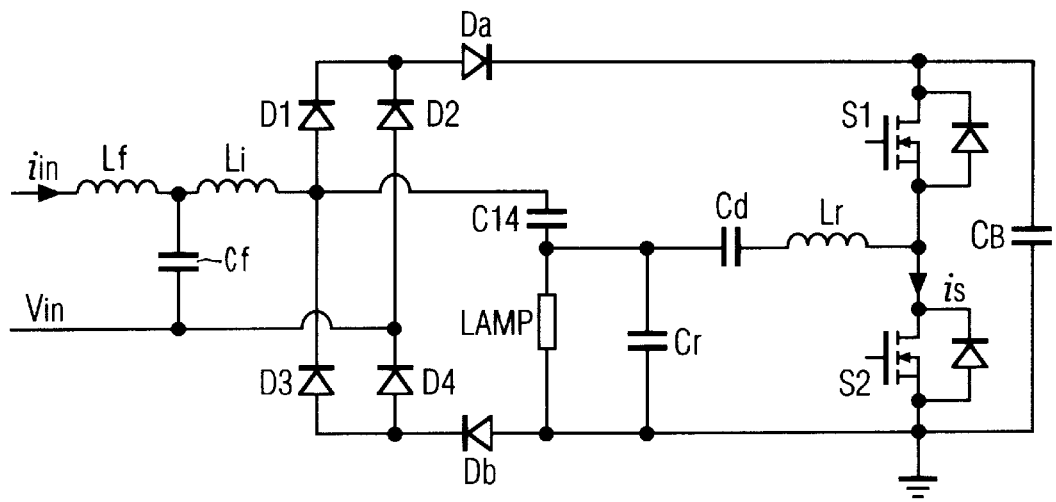
FIG. 4 is a simplified schematic diagram of a variation of the circuit of FIG. 1 having voltage feedback.

The converter shown in FIG. 4 uses voltage feedback, so-called because the feedback is proportional to the voltage across the lamp. Elements having the same function, and which would probably have the same circuit value for a same line voltage and lamp wattage, have the same reference numeral. Except for the line input inductor, the bridge rectifier and inverter are the same as those of FIG. 1. The load circuit is connected from the inverter output node to the DC ground bus, rather than to the AC-side of the bridge rectifier, but in other respects the load circuit elements have the same function as in FIG. 1. A high frequency capacitor C14 is connected from the lamp terminal, which is also connected through the DC blocking capacitor Cd and resonant inductor Lr to the inverter output. As in FIG. 1, where the input inductor Li affects the resonant circuit, here the connection of the capacitor C14 and an input inductor Li affect the resonant circuit. As result, for a same line voltage and lamp the optimum values of inductances and capacitances will usually be different from those used in FIG. 1, and different reference numerals are used where circuit values may differ. The functions are, however, all similar.

High frequency capacitor C14 stores charge during a portion of each high frequency cycle, which is then transferred to the bulk capacitor Cb during a different portion of the cycle.

Figure 5:
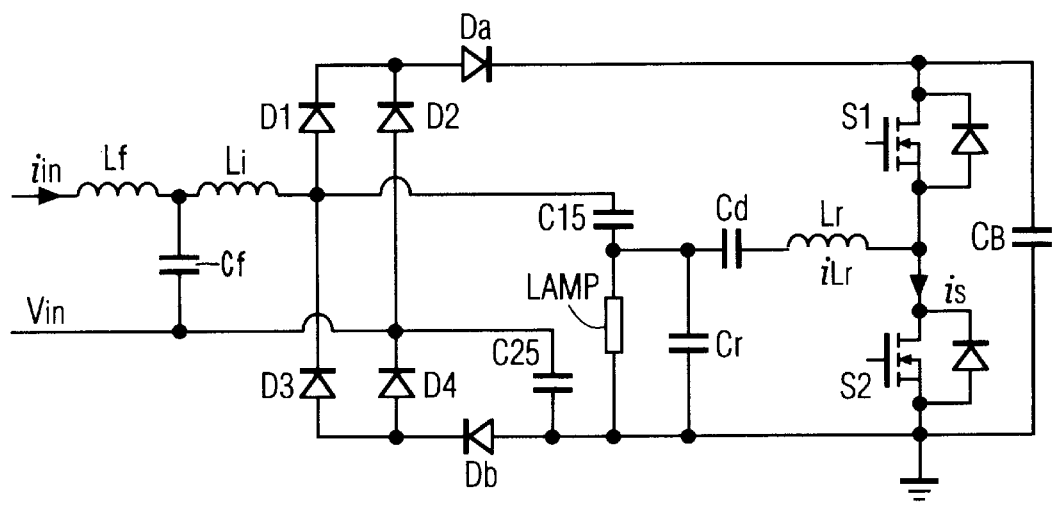
FIG. 5 is a simplified schematic diagram of a variation of the circuit of FIG. 4 having two feedback capacitors.

The circuit of FIG. 5 is identical to that of FIG. 4, except for addition of a second high frequency capacitor C25. C15 and C25 are charged during different portions of the high frequency cycle, so the individual pulses of current are smaller. This reduces the energy storage in the high frequency components so that component stresses are lower. As before, the interrelationship of the parts involved in carrying high frequency current or transferring energy during periods of the high frequency cycle may require change in component values for optimization, but this is a mere routine for one of ordinary skill.

Figure 6:
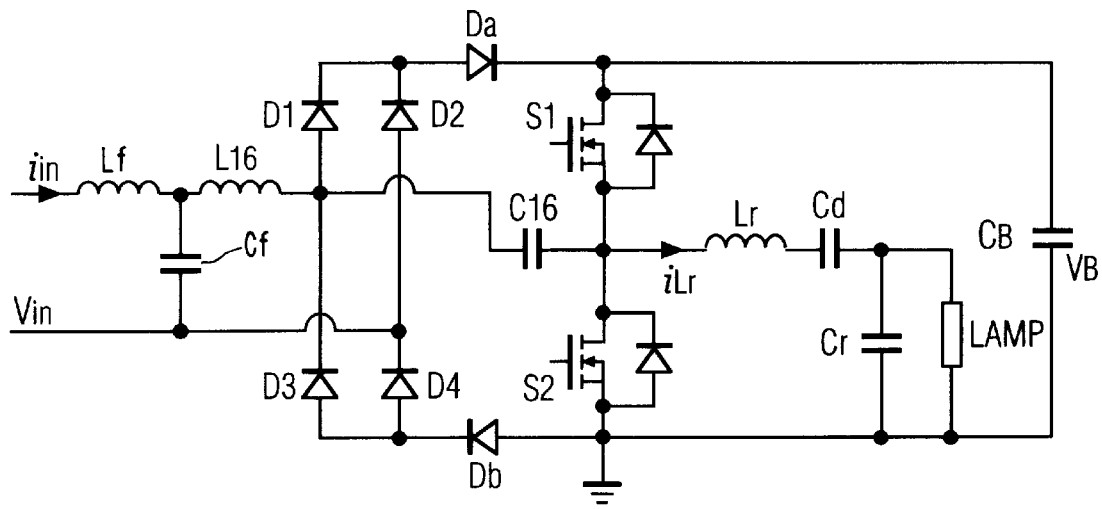
FIG. 6 is a simplified schematic diagram of a variation of the circuit of FIG. 4 having a feedback capacitor directly from the inverter output.

The circuit of FIG. 6 exhibits voltage feedback where, compared with a converter lacking power factor correction, the load circuit is affected only to the extent that the DC bus voltage is affected. C16 provides a connection between the two inductors during the period between switching off of one transistor, and the switching on of the other. The value of C16 is determined at least partly by the lamp power, while the value of L16 is determined partly by the lamp voltage.

Figure 7:
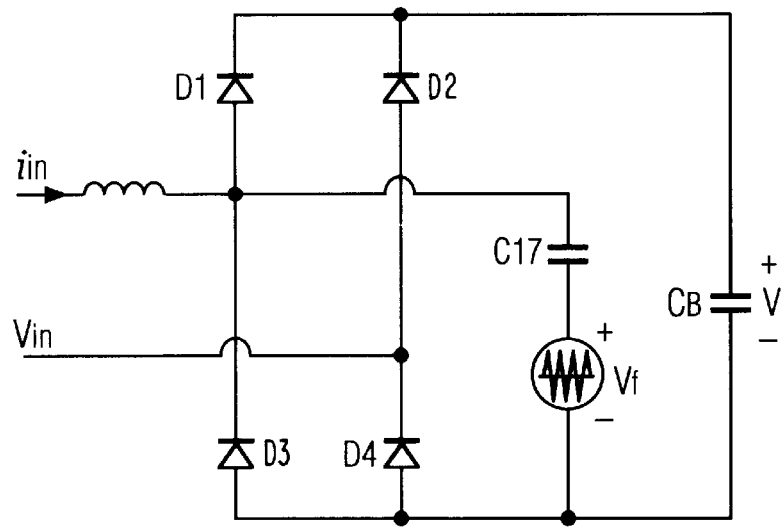
FIG. 7 is a conceptual circuit showing voltage feedback to the AC-side.

FIG. 7 shows a conceptual idealized voltage feedback converter. Feedback is provided from a high frequency voltage source $v_f$ through a high frequency capacitor C17. Similar to the circuit of FIG. 2, during part of each high frequency cycle C17 will be charged with one polarity. During a next part of the cycle C17 will discharge and the instantaneous difference between iin and the high frequency capacitor current will transfer energy to the bulk capacitor Cb.

Figure 8:
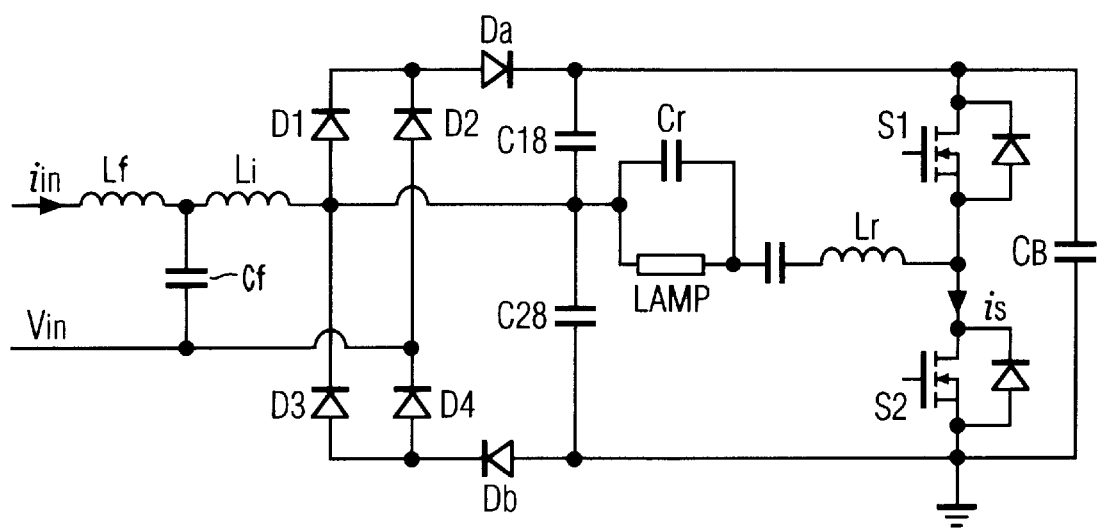
FIG. 8 is a simplified schematic diagram of a variation of the circuit of FIG. 1 having two feedback capacitors.

The circuit of FIG. 8 is like that of FIG. 1, except that it contains two high frequency feedback capacitors C18 and C28. Capacitor C18 is connected between the first AC-side terminal and the cathode of fast diode Da, which is the positive DC bus, and capacitor C28 is connected between the first AC-side terminal and the anode of fast diode Db, which is the negative DC bus. Its operation is like that of FIG. 1, except that the second high frequency capacitor is charged during the opposite half of the high frequency cycle, thereby providing full wave (from the standpoint of the high frequency) transfer of energy from a high frequency capacitor to the bulk capacitor. Hence the peak current is reduced further.

Figure 9:
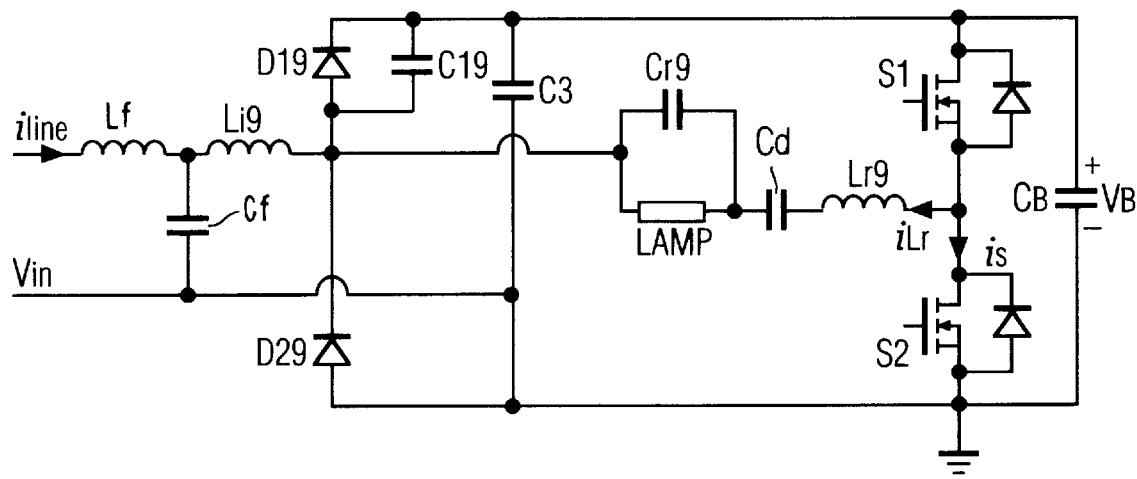
FIG. 9 is a simplified schematic diagram of a variation of the circuit of FIG. 1 having a voltage doubler rectifier.

For operation from 120 volt lines, it is often desirable to use a voltage doubler supply. FIG. 9 shows such a converter. Because only two power rectifiers are needed, it is economical that both D19 and D29 be fast recovery diodes.

Gate drive circuits for the switching transistors have not been shown, because they are not critical to the practice of the invention. To minimize cost it is desirable that the resonance inductor Lr9 have a linear core; that is, one which does not saturate sharply during normal operation. Gate drive signals can then be obtained from secondary windings on the same core as Lr9, phase shifted if necessary so as to obtain stable oscillation at the desired frequency using circuits previously known in the art, or a circuit as taught in co-pending patent application for SELF-OSCILLATING RESONANT CONVERTER WITH PASSIVE FILTER REGULATOR, Ser. No. 09/221,954, filed Dec. 28, 1998 by C. Chang and assigned to the assignee of the instant application.

It will be clear to those of ordinary skill that many other variations are possible, within the scope of the appended claims. The line inductor can be provided in either line conductor, or could be provided as two inductors of half the inductance, one in each line conductor. Many variations of the load circuit are possible, depending on lamp characteristics, or the use of a transformer to isolate the lamp or lamps.

What is claimed is:

1. A low frequency to high frequency power converter comprising:
    an inductive impedance source of low frequency line voltage, having source connection points between which the low frequency line voltage is maintained, and a line inductor having two ends, one of said ends being connected to one of said source connection points,
    a DC supply circuit having at least two diodes and four terminals, two of said terminals being AC-side terminals coupled to said source connection points, and two of said terminals being DC-side terminals, one of said diodes being connected between one of the AC-side terminals and one of the DC-side terminals,
    a half-bridge inverter connected to receive DC voltage from said DC-side terminals, said inverter comprising two switching transistors connected in series and having an output node between said transistors for providing a high frequency voltage,
    a load circuit carrying a first high frequency current, connected between said output node and one of said four terminals, said load circuit comprising a plurality of load circuit elements including a resonance inductor, at least one capacitor forming part of a resonant circuit with said resonance inductor, and two connection points for a non-linear load which is at least substantially resistive in an operating condition, and
    a high frequency capacitor providing a path for a second high frequency current, said high frequency capacitor being connected to one of said AC-side terminals and being connected to at least one of said load circuit elements, said line inductor and said high frequency capacitor having values selected such that instantaneous high frequency resonance inductor current flow into said one of said AC-side terminals has a greater magnitude than current through said line inductor into said one of said AC-side terminals during a portion of every switching cycle.

2. A converter as claimed in claim 1, characterized in that said resonance inductor and said line inductor each have a respective linear core.

3. A converter as claimed in claim 1, characterized in that said non-linear load is a discharge lamp, and
    said DC supply circuit is a voltage doubler circuit, said at least two diodes are fast recovery diodes, and said one of said terminals to which said load circuit is connected is said one of said AC-side terminals.

4. A converter as claimed in claim 3, characterized in that said high frequency capacitor is connected in parallel with one of said at least two diodes.

5. A converter as claimed in claim 1, characterized in that said non-linear load is a discharge lamp, and
    said DC supply circuit comprises a full wave bridge rectifier having four slow diodes including said two diodes, and two fast recovery diodes, one of said two fast recovery diodes being connected between one of said DC-side terminals and two of the slow diodes, and the other fast recovery diode being connected between the other of said DC-side terminals and the other two of the slow diodes.

6. A converter as claimed in claim 5, characterized in that said one of said four terminals is one of said AC-side terminals, and said high frequency capacitor is connected across one of the fast recovery diodes in series with one of the slow diodes.

7. A converter as claimed in claim 6, characterized in that said converter further comprises a second high frequency capacitor connected to said one of said AC-side terminals and across the other of the fast recovery diodes in series with a different one of the slow diodes.

8. A converter as claimed in claim 5, characterized in that said one of said four terminals is one of said DC-side terminals, and
    said at least one capacitor is connected in parallel with said discharge lamp between said one of said DC-side terminals and a feedback node, said high frequency capacitor being connected to said feedback node.

9. A converter as claimed in claim 8, characterized in that said converter further comprises a second high frequency capacitor connected between the other one of said AC-side terminals and said one of said four terminals.

10. A converter as claimed in claim 5, characterized in that said one of said terminals is one of said DC-side terminals, and said high frequency capacitor is connected between said one of said AC-side terminals and said output node.

11. A converter as claimed in claim 1, characterized in that said non-linear load is a discharge lamp, and said DC supply circuit is a full wave bridge rectifier having four diodes including said at least two diodes.

12. A converter as claimed in claim 11, characterized in that said one of said four terminals is one of said AC-side terminals, and said high frequency capacitor is connected from said one of said AC-side terminals to one of said DC-side terminals.

13. A converter as claimed in claim 12, characterized in that said converter further comprises a second high frequency capacitor connected from said one of said AC-side terminals to the other one of said DC-side terminals.

14. A converter as claimed in claim 11, characterized in that said one of said four terminals is one of said DC-side terminals, and said one capacitor is connected in parallel with said discharge lamp between said one of said DC-side terminals and a feedback node, said high frequency capacitor being connected to said feedback node.

15. A converter as claimed in claim 14, characterized in that said converter further comprises a second high frequency capacitor connected between the other one of said AC-side terminals and said one of said four terminals.

16. A converter as claimed in claim 11, characterized in that said one of said terminals is one of said DC-side terminals, and said high frequency capacitor is connected between said one of said AC-side terminals and said output node.

17. The converter as claimed in claim 1 wherein said high frequency capacitor is connected between one of said four terminals and said output node via at least a part of said load circuit.

18. The converter as claimed in claim 17 wherein the one of said four terminals is chosen from said AC-side terminals and said DC-side terminals.

19. The converter as claimed in claim 1 wherein said one of said four terminals is one of said AC-side terminals, said high frequency capacitor is connected from said one of said AC-side terminals to one of said DC-side terminals, and said resonance inductor, said at least one capacitor and a further capacitor are connected in a series circuit between said output node and said one of said four terminals.

20. The converter as claimed in claim 19 wherein the one of said four terminals is chosen from said AC-side terminals and said DC-side terminals.

\* \* \* \* \*